May 12, 1936.  J. SCHMIDT ET AL  2,040,569
FRUIT AND VEGETABLE GRADING MACHINE
Filed June 22, 1931  5 Sheets-Sheet 1

May 12, 1936. J. SCHMIDT ET AL 2,040,569
FRUIT AND VEGETABLE GRADING MACHINE
Filed June 22, 1931 5 Sheets-Sheet 3

May 12, 1936.  J. SCHMIDT ET AL  2,040,569
FRUIT AND VEGETABLE GRADING MACHINE
Filed June 22, 1931  5 Sheets-Sheet 4

Fig. 4.

Patented May 12, 1936

2,040,569

UNITED STATES PATENT OFFICE 2,040,569

FRUIT AND VEGETABLE GRADING MACHINE

John Schmidt, Buffalo, N. Y., and Edward C. Eberts, Jeffersonville, Ind.; said Schmidt assignor to Food Machinery Corporation Application June 22, 1931, Serial No. 546,125

16 Claims. (Cl. 209—173)

This invention relates to an improved apparatus for quality grading green peas and like vegetables by taking advantage of the difference in specific gravity incident to natural growth as well as a change in specific gravity due to special treatments prior to the separation operation.

When peas, beans and similar products are grown for commercial canning and preserving purposes, land and weather conditions are encountered that are more or less beyond the grower's control. Vitality of seeds; depth of planting; methods of cultivation; and harvesting are all more or less of a question under conditions of large production, all of which bring about varying time of maturity or ripening to a condition suitable for canning, so that, while some of the product will have reached just the desired stage of development, other of the product in the same field will have advanced beyond the desired stage of development and other parts of the product will not have reached the desired stage of development, all of which means that a very varied and mixed product is delivered to the canning plant to be treated and separated into the varying grades desired for canning purposes.

Referring particularly to peas, these are required young and tender and for some grades of a uniform size and quality for the fancy grades of the pack.

Even a few mature peas distributed through a can of fancy grade peas will likely reduce the grading to a lower level both as to quality and price. It is the canner's desire, therefore, to increase as much as possible his pack of "fancy" goods, but in order to do this he must be provided with some means for effectively and quickly separating the "fancy" peas from the other commercial grades.

Many attempts have been made to separate the more mature peas from the young and tender grade by utilizing the difference in specific gravity naturally existing between the various grades, by floating them in bulk into and through suitable aqueous medium, depending on the heavy and more mature peas to sink in the solution and the lighter or "fancy" peas to float at or near the surface. In order, however, to collect the various grades as separated it has been necessary to resort to more or less inefficient methods. Usually skimming conveyors have been used for this purpose, but the agitation produced has had a more or less effect to disturb the separation and to remix the grades again as the skimmers passed through the solution. Tanks of considerable depth have been tried with the idea that there would be more space between the separations and therefore, the separated groups would be more easily removed. None of these plans have been entirely satisfactory.

The medium generally used for effecting the desired separation of the different grades has been a salt solution of varying density according to the condition of the peas being handled. It has been found that the density of a solution increases quite markedly at the lower depths on account of a settling of the heavier elements and that peas subjected to this increased density for only a very short time became so salt laden as to render them unpalatable and unsalable.

Thus was injected into the canning operation a very uncertain and undesirable condition of practice that was entirely beyond the control of the canner. A few salt saturated peas in a can of otherwise high grade product might easily cause a condemnation of the entire pack as of doubtful quality.

Further difficulties were also experienced when handling the so called "sweet peas", which show little or no difference in specific gravity in the ordinary salt solutions, due mainly to growth conditions. Thus, where it was desired to separate the young and tender peas from the more mature peas of a lower price grade, the ordinary specific gravity method was found ineffective and undesirable.

Applicants have evolved a method and apparatus for separating the different quality grades of peas in a rapid commercial way that is highly efficient and dependable and which gives the canner a product quite appreciably better than has been possible before.

Applicants' method consists in successively subjecting measured quantities of mixed peas to a series of substantially quiescent bodies of separating solution, leaving each such batch practically undisturbed during the separating period and in providing means in the handling of the solution to automatically remove the separated groups as fast as they accumulate so that the separating space will be practically vacant when a new batch is placed therein. The method further consists in placing a series of such separating chambers in consecutive operative relation and in supplying means for discharging measured quantities successively into said chambers so that separations in all degrees of progress are being carried on simultaneously. The method further consists in subjecting the mass of mixed peas to a body of separating medium that is quiescent as far as separation is concerned but which has a gradual flow to automatically remove the separated groups as fast as they accumulate. The method consists also in other features that will be specifically pointed out in the ensuing description.

The apparatus part of applicants' invention comprises the provision of a series of separating chambers into which measured quantities of mixed grades of peas may be dumped; supplying a separating medium for said chambers and means for causing a gentle flow in parts of said medium and a more rapid flow in other parts of said medium; providing automatic means for measuring and delivering batches of mixed grades of peas to said chambers; providing an arrangement of operative elements and controlling the directions of flow of the separating medium so that the same medium acts to separate the individual batches of peas placed therein and at the same time as the conveying means for transporting the separated groups out and away from the separating chambers; in providing means for drawing separating medium from the main supply and transferring it to the bulk of medium in and around the separating chambers so that at no time is the entire or a part of said medium allowed to stand in absolute quiescence, therefore the general density of the medium is maintained more uniform. The apparatus part of applicants' invention comprises other and equally important features than have been above enumerated and which will be clearly pointed out in the ensuing description. From the foregoing it is evident that applicants have evolved numerous novel and new combinations of structure and operation.

It is therefore an object of the invention to provide a method of separating peas or like vegetable materials into groups having the same characteristics.

It is a further method of separating mixed groups of peas or the like into other groups of peas of like characteristics and removing the separated groups in substantially opposite directions.

It is a further method of applicants' invention to measure peas or like vegetables into like quantities; pass them successively to a series of adjacent separating chambers so that each measured batch has undisturbed periods of separation before another batch is dumped into that separating space.

It is a still further object of the invention to provide a method of separating measured batches of mixed grades of peas or the like in a suitable solution wherein the portions acting as the separating medium are in substantially a quiescent state while other portions of the same medium are given sufficient flow to quickly move the separated groups away from the separating chamber.

It is also an object of the invention to provide a method of separating mixed grades into separate groups of like characteristics in a series of adjacent compartments, providing a method of flow of solution that automatically varies its speed of flow according to its position in the system whereby the increased flow acts as a conveying means to move the separated groups away from the separating chambers.

It is also an object of the invention to provide a method of separating masses of mixed grades of peas or the like into separated groups of like characteristics by providing a flow of separating medium, placing separating chambers in shunt connection therewith whereby the medium flows through said chambers at a much slower speed than the normal flow of said medium in other places in said system.

It is a further object of the invention to provide a method of separating peas or like material into groups having like characteristics and in moving the separated groups in opposite directions through a controlled flow of the medium.

It is also an object of the invention to provide an apparatus for separating mixed batches of peas or like materials into groups having the same characteristics and utilizing the separating solution as a conveying means after separation takes place.

It is also an object of the invention to provide in an apparatus for separating peas or like materials into groups of like characteristics a series of separating compartments in a straight line arrangement and connecting the whole series of compartments with a single header whereby the flow of material through the header will supply all compartments with solution.

It is also an object of the invention to provide in an apparatus for separating mixed grades of peas or like materials into groups of like characteristics a series of separating compartments open at the top and bottom so that the sinkers will pass out of the bottom and the floaters pass out of the top.

It is also an object of the invention to provide means for measuring uniform quantities of mixed grades of peas or the like, convey them in unison and discharge them successively into a series of positioned chambers where each batch is separated into groups of peas having like characteristics and causing the flow of solution to carry each separated group out of the separating chamber.

It is also an object of the invention to measure uniform charges of mixed grades of peas or like materials, deliver each measured charge successively to a series of conveyor buckets, provide a series of separating chambers along the path of travel of said conveyor buckets, means along said path for discharging said buckets successively into the series of separating chambers and repeating such successive discharge to make a continuously operating system but giving each charge sufficient time to effect full separation before the next batch is dumped into the chamber.

It is also an object of the invention to direct a flow of separating medium along a prescribed path, to place a series of treating chambers along said path and in shunt connection with solution moving through said path whereby a part of the flowing solution will slowly rise in said chambers to form a separating body of substantial quiescence and then providing means whereby the flow is increased as it passes from the top of said chambers to act as a conveying means to carry one portion of the separated mass from the chamber.

It is a further object of the invention to provide a series of separating chambers of varying cross sectional area whereby the flow of solution therethrough is faster in one portion than in another portion of said chambers.

It is also an object of the invention to provide a consolidated unit mechanism for separating mixed masses of peas or like objects into separate groups having like characteristics; mounting a series of separating chambers along the path of flow of a separating medium; having shunt connection between said chambers and said flow whereby solution will slowly flow through said chambers on account of a slight retardation of flow occasioned by creating a slightly uphill path for said path of flow.

It is also an object of the invention to provide a consolidated unit mechanism for separating mixed masses of peas or like articles into separate groups having like characteristics wherein a series of separating chambers are arranged along the path of flow of a body of separating solution and have shunt connection therewith whereby there is a slow rise of solution upward through said chambers and which upward flow will assist in the separation due to the added buoyancy effect thereby giving the same separation effect with a brine solution of less density.

It is also an object of the invention to provide a method of controlling the brine density by adding salt in granular form to the flowing solution direct, to get quick and effective changes therein.

It is also an object of the invention to provide an apparatus for separating masses of mixed grades of peas or like material into groups of like characteristics wherein the separation takes place so quickly that the tender skinned peas are separated and removed from the separating medium before they have an opportunity of absorbing the brine.

With such objects in view as well as other advantages inherent in the invention, the novel structural peculiarities, novel organization of elements, and the separate and collective operations involved in carrying out the recited objects of the invention, which will be made the subject matter of claims hereto appended, we wish it understood that the several necessary elements and combinations constituting the same may be varied in their proportions, placement, general arrangement and operative relation without departing from the scope and nature of the invention.

In carrying out the objects of the invention in a concrete form or machine, further objects, advantages and improvements have been evolved than have been recited, and in order to make the invention more clearly understood there are shown in the accompanying drawings, means and mechanism embodying the preferred structural arrangement and disposition of the different parts and combinations, in which we have simply illustrated one way of embodying the creative part or concept of the invention in a machine, and in so doing we do not wish to limit the claims to the exact details shown. The described devices are simply embodiments of the invention that other structures might employ and some of the parts and combinations of parts may be used without the others in different types of such machines without departure from the purview of our invention so that we regard ourselves as entitled to such variations from the shown and described devices as fall within the scope and meaning of the claims.

Reference now being had to the accompanying drawings a clearer and better understanding of the invention will be had, wherein:

Fig. 3 is a plan of Fig. 1.

Fig. 8 is a sectional detail showing the inner construction of the measuring device at the lower left of Fig. 1 and is shown in this application to make a complete disclosure of measuring and feeding in combination with the present apparatus. This device is covered by applicants' issued Patent No. 1,723,211 wherein will be found a full description of the operation of measuring uniform quantities of peas for further treatment.

Before passing on to a description of the machine as represented by the accompanying drawings applicants wish to point out that these drawings are more or less diagrammatic in character; are not necessarily made to a uniform scale; they may not represent the best or the preferred engineering practices in connection with the construction of machines of this type or nature, and the proportions and relation of the parts may be more or less exaggerated in size or shape to better illustrate the application of the invention to an operative machine.

The machine illustrated herein to which applicants' concept has been embodied comprises a frame work that is adapted to contain and support the entire operative mechanism. The separating element consists of a series of vertically positioned conduits 1, arranged in rows and having their lower ends connected with substantially horizontally positioned conduits 2, which conduits are in turn connected with a header 3 into which solution is continuously pumped by the pumping unit and pipes designated generally by the numeral 4. A general solution supply tank 5 is located for convenience directly under the separating element, but it is quite obvious that this pumping unit might be placed in any desired location in a canning plant since the piping could be extended any distance within the ordinary plant.

Figures 1, 6:
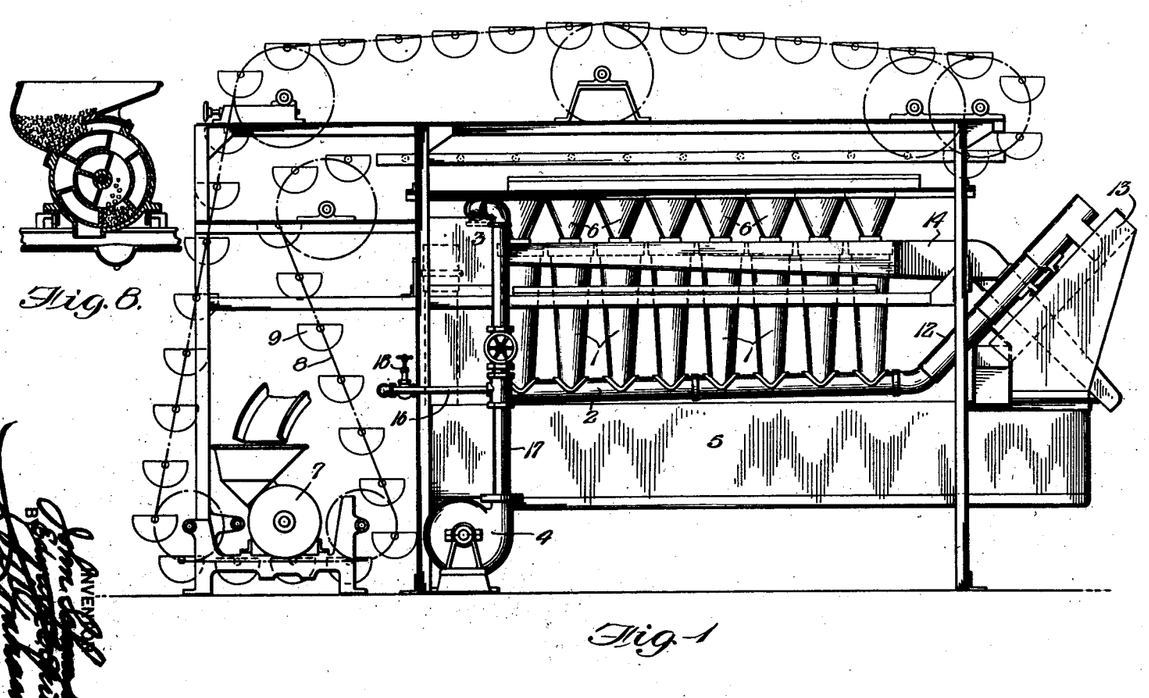
Fig. 1 represents a side elevation of the machine embodying our invention.
Fig. 6 is a cross sectional elevation taken on the same line as Fig. 5.
Figure 2:
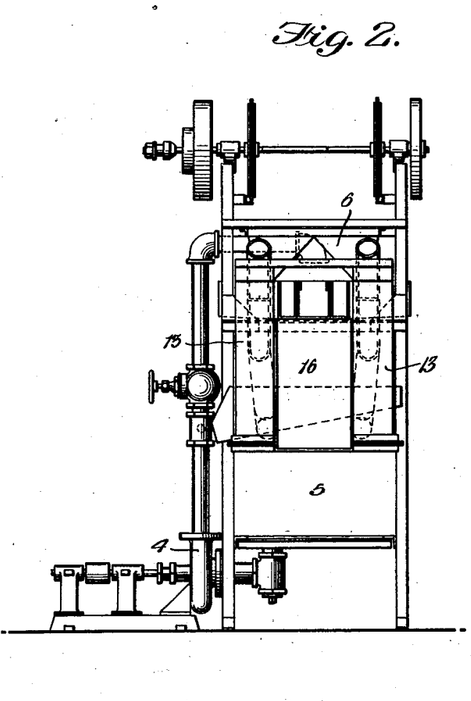
Fig. 2 represents an end elevation looking from the right of Fig. 1.
Figure 9:
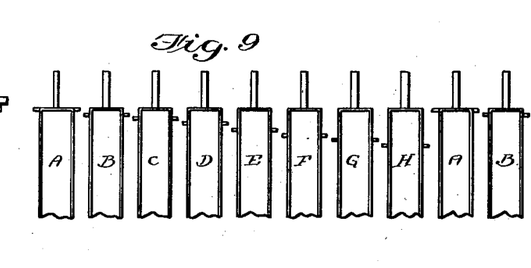
Fig. 9 is a plan in somewhat diagrammatic form, of the trackway for dumping the buckets which carry the measured charges of peas to the separating machine, and is shown herein in order to have a complete disclosure in combination with the rest of the apparatus.

Arranged directly over the rows of separating conduits or tubes, are hoppers 6 into which measured charges of mixed peas are successively dumped. The measuring and conveying system for distributing the charges of mixed peas comprises what is termed in the trade as an elevator boot 7, an inner detail of which is shown in Fig. 8 and which will be found fully described in applicants' issued patent previously referred to. Moving in cooperation with the boot 7 is a conveyor chain 8 carrying pivoted buckets 9 arranged in spaced relation along the chain and directed over a somewhat circuitous route as is well seen in Fig. 1. For convenience applicants have shown this elevator and the measuring boot as closely connected with the separating machine proper but it could as well be placed in any other more convenient place about a canning factory, since there is no real limit in the ordinary plant that the elevator could not be extended. One run of the elevator is arranged to carry the charged buckets directly over the hoppers 6 where by means of well known mechanism, partially shown in Fig. 9, the buckets are successively dumped so as to discharge their contents into the hoppers. The lower end of each hopper terminates in a tubular opening 10 which extends slightly below the tops of the separating tubes 1 so that their ends are immersed in the solution in the tubes.

The level of separating solution is controlled in the tubes 1 by means of overflow pipes 11 and 12, which have adjustable extensions on their upper ends by means of which the level may easily be raised or lowered to suit operating conditions, the solution from each overflow being directed back into the main solution tank 5.

At the discharge end of the machine both the sinkers and the floaters are discharged by the flow of solution, each falling onto suitable screens which permits the solution to run back to the main tank and the two groups of peas to be directed to suitable receivers.

The foregoing gives a general description of the apparatus so that we can now pass to the operation which will go more into detail as to just what takes place in the continuous operation of the machine.

The most important element in this invention is the use of the separating solution as a conveying means for carrying away the separated groups after separation has been effected. This novel method of operation is made possible by the ingenious arrangement of the separating tubes; the discharge of the separated groups from the ends of the tubes and the novel manner of effecting different speeds of the solution in different parts of the apparatus. It is well known that a substantial quiescence of solution is desirable when separating peas under the gravity system and this is especially desirable in quality grading where the peas have had a preliminary blanching treatment and also where the sweet pea is graded for quality.

The conduits 2 positioned longitudinally along the bottom ends of the separating tubes 1 carry a stream of solution that is given a comparatively rapid flow, sufficient to carry the sinkers falling through the bottoms of the tubes up the inclined end of the conduit 12 and discharge them onto the screen. The upper conduits 14 also should have quite a rapid flow of solution so as to wash the floaters down to the screen 15. Applicants accomplish this seemingly impossible condition of difference in flow speed of the same body of solution through the manner of distribution throughout the apparatus.

The main flow is through the conduits 2 and is produced by the injector pipes 16 connected to the main riser 17 from the pump 4 and the flow through the injector pipes controlled by the valves 18. This flow is made just strong enough to carry the sinkers up the extension conduits 12.

In order to induce a slow and easy upward flow of solution from the comparatively rapid flow in the conduits 2, into the tubes 1 the conduits 2 are given a slight elevation at the discharge end so that the solution is flowing up hill. This elevation is adjusted to give a slight back pressure which causes some of the retarded flow to rise slowly into the tubes 1 and it has been found that the upward flow in the tubes is quite uniform.

The flow in the bottoms of the tubes where the sinkers are can well be slightly faster than the flow in the top where the floaters are. The sinkers being heavy will sink in an upwardly moving body of solution, while the floaters being lighter should have the flow slightly reduced. Applicants accomplish this result by tapering the separating tubes 1 and placing the small end at the bottom where the upward flow can be greatest. This gives a comparatively large surface area of solution at the top where the floaters are to flow out of the tubes, and by making two opposite overflow openings in the tubes as at 19, the velocity of the overflow is greatly accelerated compared to the upward flow in the tubes, so that the overflow depth is sufficient to successfully float the largest peas over the bottom of the overflow opening.

Applicants have discovered that this arrangement of separating tubes with the increased flow at the bottom where the sinkers are will add a certain buoyancy to some of the peas that are light enough to be floaters and go out with that grade of pea, but which would be sinkers without the increased speed of flow which is just enough to carry these peas up with the floaters.

This added buoyancy effect given to the peas by the upward flow of solution has resulted in a reduction of the specific gravity of the separating solution and has amounted to as much as 8 points less than has ever been used before for the same kind of grading. This is of very great importance because the less salt necessary in the solution to effect the desired grading means just so much less danger of the peas absorbing salt during the separation period and thus degrading their quality.

Another virtue accruing from this upward flow of the separating solution has been the possibility of reducing the depth of solution in which the grading takes place from substantially 44 inches in the older methods to about 20 inches in this machine, which again means that the separation takes place so quickly that there is much less tendency for the most tender peas to absorb salt from the solution, adding materially to the quality of the separated product.

Figures 7, 10, 11:
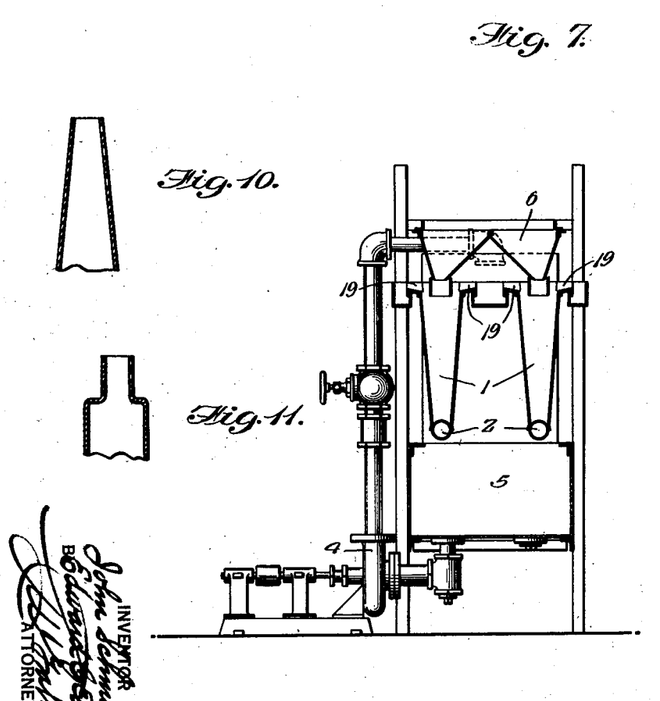
Fig. 7 is a cross sectional view on line 7—7 of Fig. 3.
Fig. 10 is a view showing one of the separating tubes with the taper running in the reverse direction from that shown in the machine, with a series of overflow openings for discharging the floating material at different levels.
Fig. 11 is a view showing a modification of the tapered tubes in that the top of the tube is of less diameter than the bottom but the walls are straight instead of tapering. This also shows graded overflow openings.

Taking advantage of this discovery that the flow of solution adds to the buoyancy of the product being handled applicants show a modification of the separating tube structure in Fig. 10 wherein the taper is just reversed from that shown throughout the drawings, and a plurality of discharge openings are shown whereby different grades of separation could be drawn off along different points in the tube. This arrangement of separating tube would permit separation to take place without any salt in the solution, but depending entirely on the buoyancy effect imparted to the peas by the upward flow of the water, and since the flow would be most rapid at the top where the tube was most restricted it would at this point have a tendency to impart more buoyancy to the floaters than to the sinkers lower down in the solution. In Fig. 11 applicants show still another modification wherein the sides of the tube might be straight but the top portion of less area than the bottom which would induce a more rapid flow in the top part the same as the taper tube.

In operation peas are conveyed in any suitable manner to the hopper of the elevator boot 7 and are there measured in uniform charges and delivered successively to the elevator buckets passing thereunder. The charged buckets move along the outer and upper runs of the elevator thus giving time for the water to drain from the peas before they are dumped into the separating tubes. As the peas, or buckets start on the lower run directly over the hoppers 6 they are successively dumped into the hoppers, and when a hopper receives a charge of mixed peas no more are dumped into that hopper until the other seven hoppers of the series receive likewise a charge of peas in succession. This gives each charge time to separate and be flowed away from the tube before a new charge is delivered to the tube.

Figure 4:
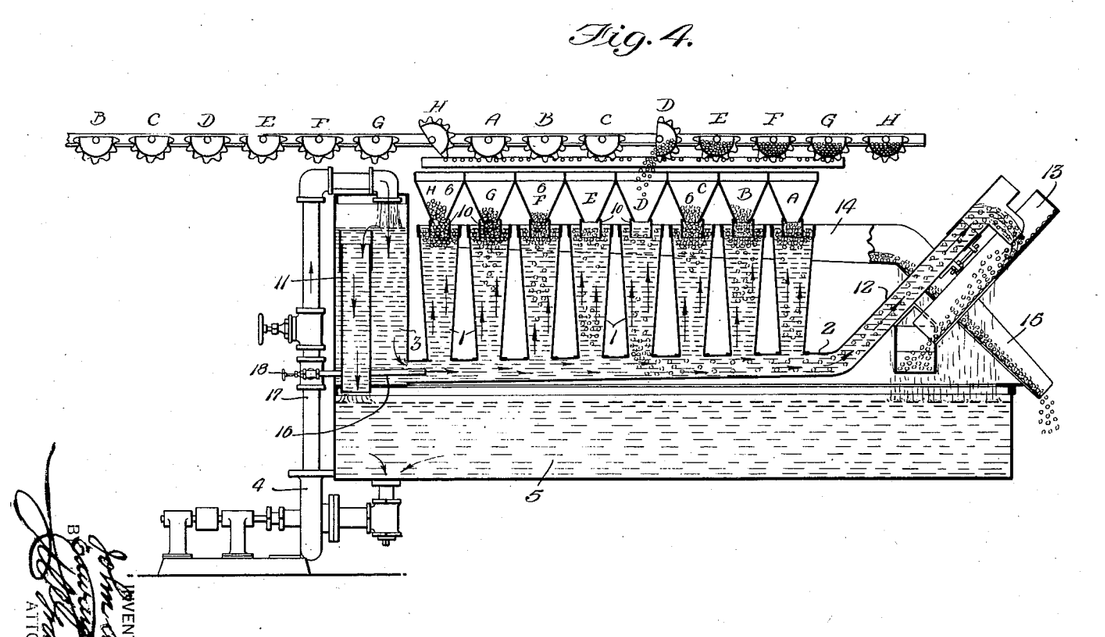
Fig. 4 is a vertical sectional elevation taken on approximately the line 4—4 of Fig. 3.
Figure 5:
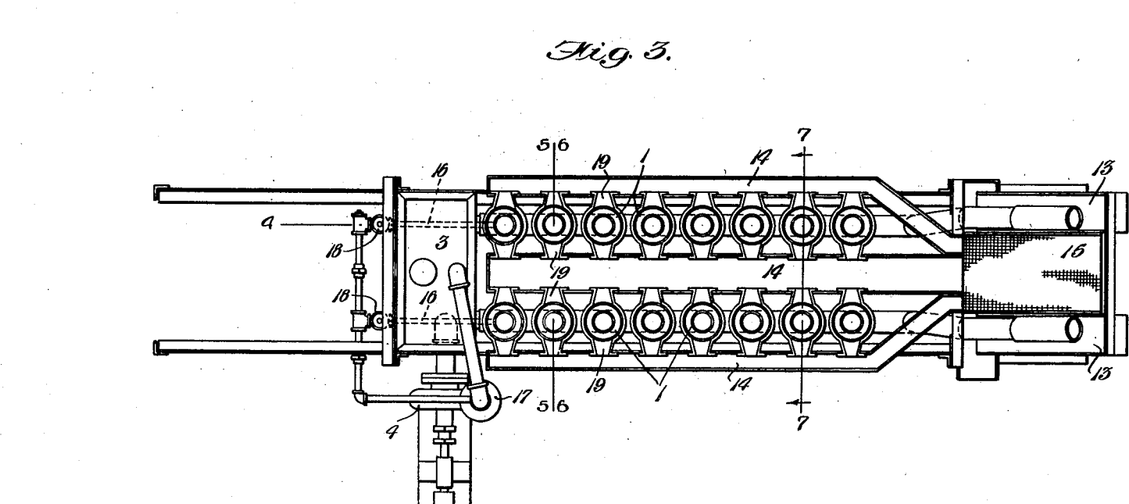
Fig. 5 is a cross sectional elevation taken on approximately the line 5 of Fig. 3.
Figure 6:
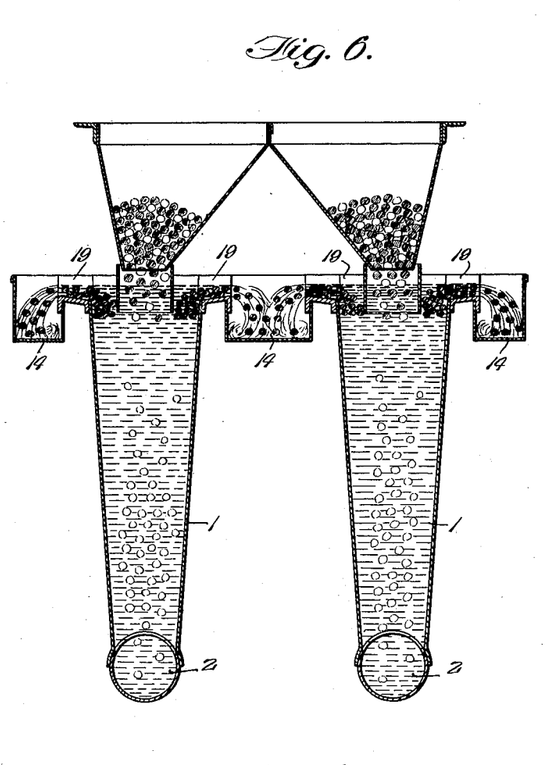

Fig. 4 shows in a somewhat diagrammatic manner just how this part of the operation is carried out. The hoppers of a series have been lettered from right to left with the characters "A" to "H" and the buckets above have been lettered likewise. Starting at the left of the view it will be seen that bucket "H" has just dumped a charge of mixed peas into hopper "H" where separation has not yet started. Bucket "G" which has passed beyond the hoppers dumped its charge into hopper "G" as it passed. Bucket "F" dumped its charge in hopper "F" and bucket "E" dumped its charge in hopper "E". The peas in hopper, or rather tube "E" have practically completed their separation, and in tube "D" the separation is complete and a new charge is just entering from bucket "D". The peas in tube "E" will be completely separated by the time bucket "E" reaches there and dumps its load, while the peas in tube "F" will be completely separated by the time bucket "F" will reach there and dump its load. In this view will be seen separation taking place in all stages, with the separated groups being floated away as fast as they reach the conduits and the overflows at the tops of the tubes so that a charge has been completely separated without disturbance and removed from each tube before another mixed charge is dumped into the tube.

The arrangement of separating tubes with the main conduit at the bottoms thereof through which quite a swift stream of solution may flow and the large area of solution at the tops of the tubes with a restricted overflow permits swift flowing streams where each separated group is discharged from the tubes with the result that the separation is never retarded and as fast as peas reach the discharge points they are quickly carried away to give room for the others following, there is never any chance for clogging at the discharge points and the peas are never crowded, they can separate as fast as their buoyancy will permit, which gives the most rapid separation yet effected by mechanical means, and as pointed out the rapidity of separation means less absorption of the brine by the tender skins of the most delicate peas and the possibility of passing a greater volume of product through the machine in a given time, resulting in much higher quality of finished product and a much reduced expense of operation for this higher quality which accrues to the consuming public as well as to the canner.

What we claim as new and desire to secure by Letters Patent is:

1. An apparatus for separating individual charges of mixed masses of peas or the like into groups of like characteristics comprising a plurality of horizontally disposed conduits with elevated discharge points, a plurality of vertical conduits rising therefrom forming isolated separation areas, and a plurality of horizontal conduits connecting the tops of said vertical conduits, a supply tank forming a head for forcing a flow of separating solution through all of said conduits, continuously moving means for periodically depositing an individual charge of peas successively into each of said vertical conduits for individual charge separation wherein those of greater density will sink and those of lighter density will float without interference from other charges, the natural flow of said streams acting to remove the separated groups from said vertical conduits between charges.

2. An apparatus for separating mixed individual charges of peas into groups of like characteristics comprising a series of vertically disposed tubes arranged in a substantially straight line to form isolated separation areas, a horizontal conduit connecting the lower ends of said tubes and having an elevated discharge, a series of smaller tubes extending into the top opening of said series of vertical tubes, with means for periodically depositing mixed individual charges of peas into said smaller tubes, a solution tank providing a head for forcing a separating solution horizontally through said conduit and vertically through said tubes to an overflow therefrom to provide an isolated separation area for each charge the floating peas being carried away by the overflow from the said vertical tubes before another charge is deposited.

3. An apparatus for separating granular material into groups of like characteristics comprising a series of vertically disposed tubes arranged in substantially a straight line to form isolated separation areas, a horizontally disposed conduit extending along the lower open ends of said tubes and having an elevated discharge, a raceway connecting the top ends of said tubes a solution tank providing a head for forcing a separating solution through said horizontal conduit, said vertical tubes and spilling into said raceway, means for successively depositing individual charges of granular material into the solution near the tops of said vertical tubes wherein separation takes place and the lighter material spilling with the solution into the said raceway before another charge is deposited therein and the heavier material passing into the said horizontal conduit to be removed thereby through said elevated discharge.

4. An apparatus for separating granular material into groups of like characteristics through flotation comprising a series of vertical conduits larger at the top than at the bottom to slow the speed of flow at point of separation a horizontal conduit connecting the lower open ends of said vertical conduits, another horizontal conduit connecting the upper open ends of said vertical conduits, a solution tank providing a head for continuously forcing a body of solution through said several conduits and means for successively depositing individual charges of granular material in said solution in the tops of said vertical conduits for separation, the buoyant separated group passing with the overflow from said vertical conduits before another charge is deposited therein.

5. An apparatus for separating granular material into groups through flotation comprising a series of vertically disposed conduits having tapered sides to reduce the speed of solution flow horizontal conduits connecting the tops and bottoms of said vertical conduits, a solution tank providing a head for continuously moving a body of solution through said conduits, means for successively depositing groups of mixed granular material into said solution in the vertical conduits for separation, the floating group passing out with the flow of solution from the tops of said vertical conduits before depositing additional groups of material therein.

6. An apparatus for separating mixed masses of solids into groups of like characteristics comprising a tank of solution providing a head, a horizontal conduit along which a stream of solution flows from said tank, vertical conduits arranged in flow contact with said horizontal conduit through which portions of said horizontal stream may flow in substantially a vertical direction to form isolated vertical columns with means for then combining the flow of said vertical columns into a unit stream, means for successively depositing masses of mixed solids into the said vertical streams for separation between successive charges wherein the heavier material will settle into said horizontal stream and be carried away thereby and the material that floats will follow the discharge flow of the vertical streams and be carried away into said unit stream.

7. An apparatus for separating mixed masses of solids into groups of like characteristics comprising a tank of solution providing a head, a horizontal conduit along which a stream flows from said tank, an elevated discharge for said horizontal stream, vertical conduits connecting with said horizontal conduit through which portions of said stream are shunted to form isolated separation areas, means for combining the discharge flow of said isolated separation areas into a unit stream, means for depositing successive charges of mixed solids into said isolated separation areas in timed sequence so as to give time for each charge to separate and be carried away before the deposit of the succeeding charge, the separated groups being carried away by the flow of said horizontal and vertical streams.

8. An apparatus for separating individual charges of mixed peas into groups of like characteristics through the medium of a separation liquid comprising a horizontally disposed liquid conduit with an elevated discharge, a vertical liquid conduit rising therefrom to form an isolated separation area, and a horizontal conduit leading away from the top of said vertical conduit, means for intermittently depositing measured charges of peas into said vertical conduit so separation takes place between charges, means for directing each charge somewhat below the top of said vertical conduit and under the surface of the solution therein, a solution tank providing a head for flowing a body of solution through said first horizontal conduit and upwardly through said vertical conduit, the said flow of solution being the means to carry away the floating group of separated peas from said vertical conduit between the depositing of charges in said isolated separation area.

9. An apparatus for separating material comprising a horizontal conduit having an elevated discharge through which a solution may flow, a body of solution in a tank providing a head for moving a solution therethrough, a source of supply for maintaining said head, a plurality of vertical conduits leading from said horizontal conduit into which a part of said solution will flow to fill said plurality of conduits with solution and overflow therefrom, continuously moving means for depositing charges of material successively into the solution in said plurality of conduits where separation takes place, one of the separated groups flowing away with the solution from said plurality of conduits, and the other of said separated groups passing to the first mentioned conduit and flowing with the solution therein through said elevated discharge, each separated group being removed from the separating area before another charge is deposited.

10. An apparatus for separating material comprising a tank containing a body of solution providing a head, a horizontal conduit having an elevated discharge through which a solution may flow for moving a body of solution therethrough, a plurality of substantially vertically disposed conduits leading from said conduit into which a portion of solution flows continuously to fill the same and overflow therefrom, and another conduit into which said solution flows from said plurality of vertical conduits, continuously moving means for periodically placing material into said plurality of conduits where separation takes place, one of the separated groups moving against the flowing solution to pass from said plurality of conduits after separation, each charge of material being separated and removed before another charge is deposited.

11. An apparatus for separating mixed masses of peas into groups of like characteristics comprising a series of separating chambers tapering larger at the top and having an overflow for solution and arranged in consecutive relation, a tank providing a head for causing a flow of separating solution into and through said chambers, the tapered top portions of said chambers providing a substantially quiescent isolated separating chamber, means for conveying said charges to said separating chambers in succession, means for depositing said charges in said chambers consecutively and in timed relation, said chambers being fixed as to location, the charges in said separating chambers assuming groups of substantially like characteristics, one group following the natural discharge flow of solution from said chambers and another group moving against the flow of solution by gravity in said chambers in their discharge therefrom.

12. An apparatus for separating mixed masses of peas or the like vegetables into groups comprising a series of vertically disposed separating chambers, the tops of said chambers having a larger diameter than the bottoms, conduits adapted to continuously carry solution to and from said chambers, a tank of solution providing a head to cause a flow of solution upwardly through said chambers, means for measuring and feeding charges of peas or the like, a series of conveyor pockets for receiving said charges and depositing them consecutively and in succession into each of said chambers where a separation takes place, one separated group passing out of said chambers with the natural discharge flow of solution overflowing therefrom, and another group passing out against the natural flow of solution and through one of said conduits.

13. An apparatus for separating mixed masses of peas or like vegetables and granular materials into groups of like characteristics comprising a series of vertically disposed tapered walled conduits diverging upward and disposed in substantially straight line sequence forming isolated separation areas, horizontal conduits connecting the open top and bottom ends of said taper walled conduits and having an elevated discharge, a tank of solution providing a head for causing a flow of separating solution through all of said conduits, the speed of flow being greater in the horizontal conduits than in the vertical, continuously moving means for successively placing measured charges of material in the vertical conduits for separation wherein the separated groups will pass to the horizontal streams of solution for removal before depositing additional charges of material.

14. An apparatus for separating material comprising a series of substantially vertically placed conduits having vertically diverging sides, a lower and an upper horizontal conduit connecting said series of vertical conduits so that solution may flow therethrough, means for causing a flow of solution through said conduits, the said lower horizontal conduit being higher at one end and having an elevated outlet to offer a slight retardation to the flow of solution so that a portion of said flow will rise uniformly through said series of vertical conduits, means for periodically and successively placing separate charges of material in each of said vertical conduits where separation takes place near the top thereof and the separated groups are flowed away by the separation solution.

15. The method of separating individual charges of mixed solids into groups of like characteristics consisting in flowing a stream of separating solution through a horizontal path, shunting a portion of said stream through a vertical path to form an isolated continuously flowing and overflowing vertical column of separating solution, successively and periodically placing measured charges of mixed solids into the upper areal zone of said vertically flowing column of solution where the solids of like characteristics will sink in said solution and collect in said horizontal flowing stream of solution to be carried away thereby, the portion of said mixed charges that does not sink being floated away by the overflow of the constantly rising column of solution, separation of said mixed charges taking place before depositing another charge in said solution.

16. The method of separating individual charges of mixed solids into groups of like characteristics consisting in flowing a stream of separating solution through a horizontal path for a portion of its flow and then through an inclined path upwardly to cause a slight back pressure in the horizontal flow and thereby shunt a portion of said flow through a vertical path to form an isolated continuously flowing and overflowing column of separating solution, successively and periodically placing measured charges of mixed solids into the upper areal zone of said vertical flowing column of solution where solids of like characteristics will sink in said solution and collect in said horizontal flowing stream of solution to be carried away thereby, the portion of said mixed charges that does not sink being floated away by the overflow of the continuously rising column of solution, separation of said mixed charges taking place before depositing another charge in said solution.

JOHN SCHMIDT.
EDWARD C. EBERTS.